United States Patent
Manickam et al.

(10) Patent No.: US 12,526,206 B2
(45) Date of Patent: Jan. 13, 2026

(54) PROACTIVE CONGESTION NOTIFICATION BASED ON SERVICE LEVEL AGREEMENT THRESHOLDS

(71) Applicant: Cisco Technology, Inc., San Jose, CA (US)

(72) Inventors: Arul Murugan Manickam, San Jose, CA (US); Laxmikantha Reddy Ponnuru, San Ramon, CA (US); Hongbo Xia, Shanghai (CN); Govindakrishnan Kannan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 18/511,153

(22) Filed: Nov. 16, 2023

(65) Prior Publication Data

US 2025/0062968 A1 Feb. 20, 2025

Related U.S. Application Data

(60) Provisional application No. 63/532,826, filed on Aug. 15, 2023.

(51) Int. Cl.
*H04L 41/5009* (2022.01)
*H04L 41/0686* (2022.01)

(52) U.S. Cl.
CPC ...... *H04L 41/5009* (2013.01); *H04L 41/0686* (2013.01)

(58) Field of Classification Search
None
See application file for complete search history.

(56) References Cited

U.S. PATENT DOCUMENTS

| | | | | |
|---|---|---|---|---|
| 7,496,655 B2 * | 2/2009 | Gopalan | ................. | H04L 43/12 709/224 |
| 7,599,290 B2 * | 10/2009 | Dos Remedios | ....... | H04L 47/12 370/230.1 |

(Continued)

OTHER PUBLICATIONS

Ramakrishnan, K., Floyd, S., & Black, D. (2001). The addition of explicit congestion notification (ECN) to IP (No. rfc3168). 63 pages.

(Continued)

*Primary Examiner* — Ranodhi Serrao
(74) *Attorney, Agent, or Firm* — Lee & Hayes, P.C.

(57) ABSTRACT

Techniques described herein can enable proactive congestion notifications based on service level agreement (SLA) thresholds. The disclosed techniques can be performed at a network router device. The router can monitor network traffic performance measurements of network traffic associated with an SLA. The SLA can be associated with an SLA policy, and the SLA policy can comprise performance thresholds such as loss/latency/jitter thresholds, and a congestion notification policy. The congestion notification policy can comprise a portion, e.g., a fraction or percentage, applicable to the performance thresholds to determine congestion notification thresholds. The router can send a congestion notification in response to a network traffic performance measurement exceeding a congestion notification threshold.

18 Claims, 7 Drawing Sheets

(56) References Cited

U.S. PATENT DOCUMENTS

| | | | |
|---|---|---|---|
| 8,868,735 B2* | 10/2014 | Wang | H04L 69/16 709/224 |
| 10,581,664 B1* | 3/2020 | Peng | H04W 4/24 |
| 10,986,516 B2* | 4/2021 | Dao | H04W 24/08 |
| 11,399,293 B2* | 7/2022 | Dao | H04W 24/02 |
| 11,470,005 B2* | 10/2022 | Mermoud | H04L 45/28 |
| 2006/0203730 A1* | 9/2006 | Zur | H04L 47/2441 370/395.43 |
| 2008/0037552 A1* | 2/2008 | Dos Remedios | H04L 41/0896 370/395.21 |
| 2012/0120798 A1* | 5/2012 | Jacquet | H04L 47/41 370/230 |
| 2012/0198020 A1* | 8/2012 | Parker | H04N 21/2343 709/217 |
| 2013/0159548 A1 | 6/2013 | Vasseur et al. | |
| 2013/0205002 A1* | 8/2013 | Wang | H04L 69/16 709/224 |
| 2014/0101228 A1* | 4/2014 | Dalela | H04L 47/39 709/203 |
| 2015/0263959 A1 | 9/2015 | Patwardhan et al. | |
| 2016/0028632 A1* | 1/2016 | Vasseur | H04L 12/28 370/237 |
| 2018/0262924 A1* | 9/2018 | Dao | H04W 72/535 |
| 2018/0375753 A1 | 12/2018 | Mirsky et al. | |
| 2019/0386924 A1 | 12/2019 | Srinivasan et al. | |
| 2020/0099572 A1* | 3/2020 | Peng | H04M 15/60 |
| 2020/0167258 A1* | 5/2020 | Chattopadhyay | G06F 9/5088 |
| 2020/0196169 A1* | 6/2020 | Dao | H04W 72/535 |
| 2021/0235288 A1* | 7/2021 | Dao | H04W 24/08 |
| 2022/0321476 A1* | 10/2022 | Williams | H04L 47/11 |

OTHER PUBLICATIONS

Bensley, S., et al., "Data Center TCP (DCTCP): TCP Congestion Control for Data Centers", Internet Engineering Tast Force (IETF), Request for Comments: 8257, Oct. 2017, 17 pages.

* cited by examiner

PROACTIVE CONGESTION NOTIFICATION BASED ON SERVICE LEVEL AGREEMENT THRESHOLDS

CROSS REFERENCE TO RELATED APPLICATION

This application claims the benefit of U.S. Provisional Application No. 63/532,826 filed Aug. 15, 2023, and entitled "PROACTIVE CONGESTION NOTIFICATION FOR SERVICE LEVEL AGREEMENT," the contents of which are hereby incorporated herein by reference in their entirety.

TECHNICAL FIELD

The present disclosure relates generally to communication networks, and to network traffic congestion reduction techniques in particular.

BACKGROUND

The request for comments (RFC) 8257, published by the internet engineering task force (IETF), provides a data center transfer control protocol (DCTCP) for congestion control for data centers. RFC 8257 extends the use of explicit congestion notifications (ECNs) to include estimating a fraction of bytes that encounter congestion, rather than simply detecting that some congestion has occurred. DCTCP then scales a transfer control protocol (TCP) congestion window based on the estimate.

While the extension of ECNs as described in RFC 8257 is useful, congestion notifications such as ECNs can also be useful in scenarios beyond those contemplated in RFC 8257. Techniques are needed to support the use of congestion notifications such as ECNs in a wider range of scenarios.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
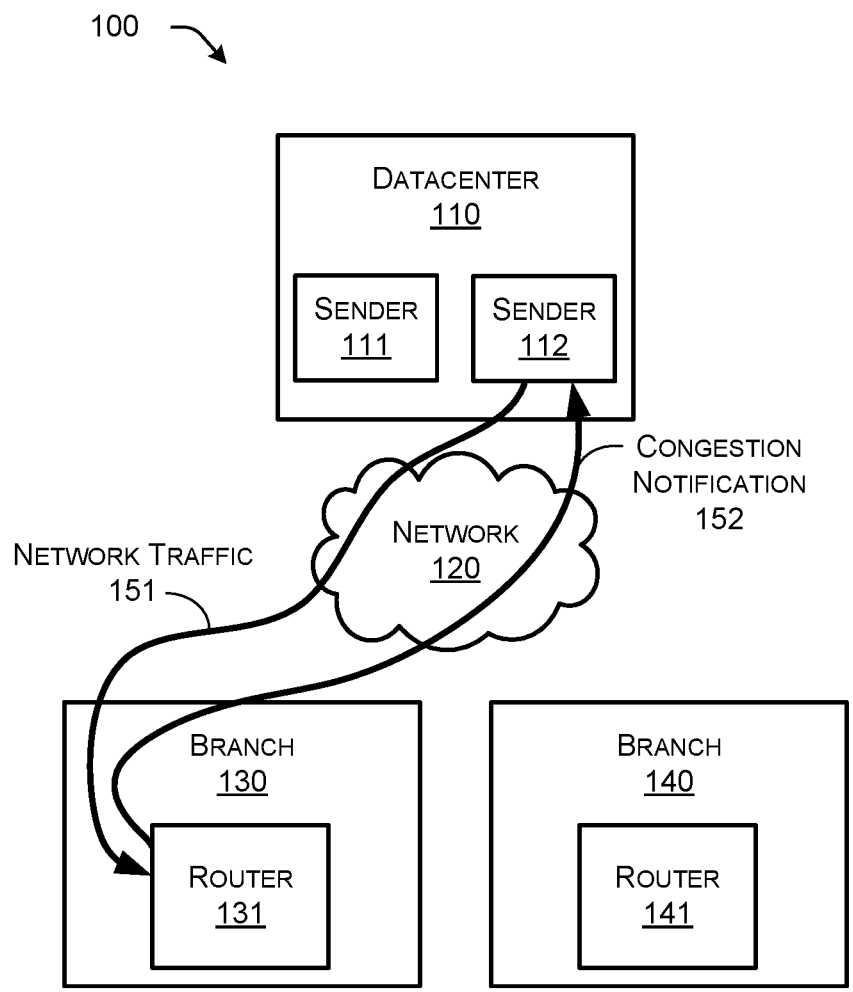
FIG. 1 illustrates an example network architecture in which the disclosed proactive congestion notification techniques can be applied, in accordance with various aspects of the technologies disclosed herein.

This disclosure describes techniques that can be performed in connection with proactive congestion notification based on service level agreement (SLA) thresholds. According to an example embodiment, a method can be performed by a computing device such as a router. The method can include monitoring network traffic performance measurements of network traffic associated with an SLA. The SLA can be associated with an SLA policy, and the SLA policy can comprise performance thresholds such as loss/latency/jitter thresholds, and a congestion notification policy. The congestion notification policy can comprise a portion, e.g., a fraction or percentage, applicable to the performance thresholds in order to determine congestion notification thresholds. The method can include sending a congestion notification in response to a network traffic performance measurement exceeding a congestion notification threshold.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

EXAMPLE EMBODIMENTS

In an example according to this disclosure, a data center may exchange data via a software defined wide area network (SDWAN) with multiple different branches, referred to as branch 1 and branch 2. The data center can comprise multiple servers and routers, and each of the branches can likewise comprise servers and routers.

Assume one of the branches, e.g., branch 1, is uploading a file to the datacenter and there is congestion at a branch edge router "CE1" at branch 1. In a scenario wherein congestion notifications are triggered by router queues reaching queue thresholds, once a queue threshold reached, the branch edge router CE1 proactively notifies a network traffic destination by setting a congestion notification, e.g., an internet protocol explicit congestion notification (IP-ECN).

The branch edge router CE1 can furthermore notify a network traffic source using an ECN bit in the transfer control protocol (TCP), to thereby cause the source to reduce a congestion window. The source can slow down a rate of network traffic sent via branch 1 by reducing the congestion window, to thereby prevent queue congestion. Otherwise, the congestion experienced at CE1 could cause packet drops, which can lead to retransmission and correspondingly poor application performance.

Embodiments of this disclosure can supplement the above scenario in which congestion notifications are triggered by router queues reaching queue thresholds. Alternatively, embodiments of this disclosure can optionally replace the above scenario in which congestion notifications are triggered by router queues reaching queue thresholds.

In addition to sending congestion notifications triggered by router queues reaching queue thresholds, congestion notifications can be triggered by performance measurements reaching congestion thresholds that are based on SLA performance thresholds. For example, the branch edge router CE1 can be configured to proactively mark IP-ECN bits when a performance measurement, such as a loss, latency, and/or jitter measurement, exceeds a defined proportion of a configured SLA performance threshold.

For example, a configured loss threshold for a voice SLA may be <=1%. A congestion notification policy configured for the voice SLA may specify that congestion notifications are sent at 75% of the voice SLA's performance thresholds. A router such as branch edge router CE1 can implement the congestion notification policy by initiating ECN marking when measured loss reaches 75% of the configured loss threshold. In this example the configured loss threshold would be 75%×1%, i.e., 0.75%. By initiating ECN marking in this manner, a data source can be instructed to reduce the data transmission rate to branch edge router CE1, thereby preventing loss from exceeding the 1% configured loss threshold.

Some embodiments of this disclosure can help to avoid a problem referred to herein as "SLA forwarding ping-pong." SLA forwarding ping-pong can occur for example in a scenario wherein a router is connected to multiple tunnels. For example, a router may be connected to four tunnels, tunnel 1, tunnel 2, tunnel 3 and tunnel 4. Furthermore, a voice SLA may specify the following performance thresholds for loss, latency and jitter: loss up to 2%, latency up to 200 milliseconds (ms), and jitter up to 30 ms.

Tunnel 4 may not be meeting the voice SLA performance thresholds (i.e., at least one of the thresholds is exceeded), however, tunnel 1, tunnel 2, and tunnel 3 may be meeting the voice SLA performance thresholds. Voice traffic can be forwarded to one of the tunnels meeting the voice SLA performance thresholds (tunnel 1, tunnel 2 or tunnel 3).

If the tunnel 1 and the tunnel 2 are performing relatively better than tunnel 3, and if the voice traffic flows to tunnel 3 at the same rate as tunnel 1 and tunnel 2, and if there is some variance, then the tunnel 3 is expected to move out from SLA forwarding. Once the voice traffic on tunnel 3 is moved out of SLA forwarding, the tunnel 3 may become less likely to be loaded with traffic, congestion will decrease at tunnel 3, and the performance of tunnel 3 may become better than tunnel 1 or tunnel 2. The tunnel 3 can therefore be returned to SLA forwarding. When this happens repeatedly, the tunnel 3 experiences ping-pong from SLA forwarding to SLA non-forwarding. Embodiments of this disclosure can help to avoid such SLA forwarding ping-pong by reducing the need to transition a tunnel in and out of SLA forwarding.

Some embodiments of this disclosure can configure routers to generate ECNs when current performance route metrics exceed congestion thresholds that are based on configured SLA performance thresholds. A configurable "congestion notification policy" can be included in SLA policies in some embodiments, and routers can be adapted to implement congestion notification policies. Below is an example SLA policy that includes a congestion notification policy:

SLA Policy
   SLA-class Voice
      Loss 2
      Latency 200
      Jitter 30
      ECN 75

The above example SLA policy includes performance thresholds including a loss threshold of 2%, a latency threshold of 200 ms, and a jitter threshold of 30 ms. Furthermore, it includes a congestion notification policy of ECN 75, i.e., send a congestion notification when performance measurements reach 75% of the performance thresholds. When a performance measurement exceeds 75% of a performance threshold, a router, e.g., an SDWAN edge router can set an ECN bit on SLA forwarding to notify a source to reduce a data transmission rate. As per ECN/DCTCP, when the congestion notification is received at a source server, the source server can responsively reduce a congestion window and eventually can reduce the source transmission rate.

A congestion notification policy can specify any portion applicable to performance thresholds. For example, a congestion notification policy can specify 65%-95%. Congestion notification policies can also be expressed in other ways, e.g., as fractions such as ¾ or ⅘ in some embodiments. Furthermore, in some embodiments, different congestion notification policies can be used with different performance thresholds, such as by using a first congestion notification policy for loss, a second congestion notification policy for latency, and a third congestion notification policy for jitter.

In accordance with the example congestion notification policy of "ECN 75", and the performance thresholds in the above example, an ECN bit can be set by a WAN edge router when a current loss exceeds 1.5%, or when latency exceeds 150 ms, or when jitter exceeds 23 ms. In response to the ECN bit, an application can slow down its transmission rate to improve end-to-end congestion for SLA forwarding. Decisions about when to stop using the ECN bit notification can also optionally be made using the congestion notification policy, or optionally, using a different percentage or portion of an SLA performance threshold.

In some embodiments, congestion notification policies can include additional or different features, beyond specifying a portion or percentage of SLA performance thresholds. For example, some congestion notification policies may specify the use of ECNs upon any change of an SLA. Some congestion notification policies may specify the use of particular types of performance measurements, e.g., based on best performance measurements (e.g., during a time window), worst performance measurements, or "best of worst" type performance measurements, or otherwise.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example network architecture in which the disclosed proactive congestion notification techniques can be applied, in accordance with various aspects of the technologies disclosed herein. FIG. 1 includes a network architecture 100 including a data center 110, a network 120, a branch 130, and a branch 140. The data center 110 includes example senders, including sender 111 and sender 112. The branch 130 includes example router 131. The branch 140 includes example router 141.

In an example according to FIG. 1, the sender 112 may send network traffic 151 via the branch 130 and router 131. The router 131 and the router 141 can be configured to send proactive congestion notifications based on SLA performance thresholds, as described herein. Therefore, in response to a performance measurement at branch 130 and/or router 131 exceeding a defined portion of an SLA performance threshold, as defined by a congestion notification policy, the router 131 can be configured to send a congestion notification 152 to the sender 112. The sender 112 can be configured to process the congestion notification 152 and responsively decrease a rate of the network traffic 151.

In some embodiments, the network 120 can comprise an SDWAN overlay, the router 131 can comprise a branch edge router, and the congestion notification 152 can comprise an ECN. The router 131 can be configured notify a network traffic 151 sender 112 or source using an ECN bit according to TCP, to thereby cause the sender 112 to reduce a congestion window used for network traffic 151. The sender 112 can slow down a rate of network traffic 151 sent via branch 130 by reducing the congestion window.

The congestion notification 152 can be triggered by performance measurements at branch 130 reaching congestion thresholds that are based on SLA performance thresholds. For example, the router 131 can be configured to proactively mark IP-ECN bits when a performance measurement, such as a loss, latency, and/or jitter measurement, exceeds a defined proportion of a configured SLA performance threshold.

For example, a configured loss threshold for a voice SLA associated with network traffic 151 may be <=1%. A congestion notification policy configured for the voice SLA may specify that congestion notifications are sent at 75% of the voice SLA's performance thresholds. The router 131 can implement the congestion notification policy by initiating ECN marking when measured loss reaches 75% of the configured loss threshold, i.e., 0.75%. By initiating ECN marking in this manner, the sender 112 can be instructed to reduce the data transmission rate of network traffic 151 to router 131, thereby preventing loss from exceeding the 1% configured loss threshold.

Figure 2:
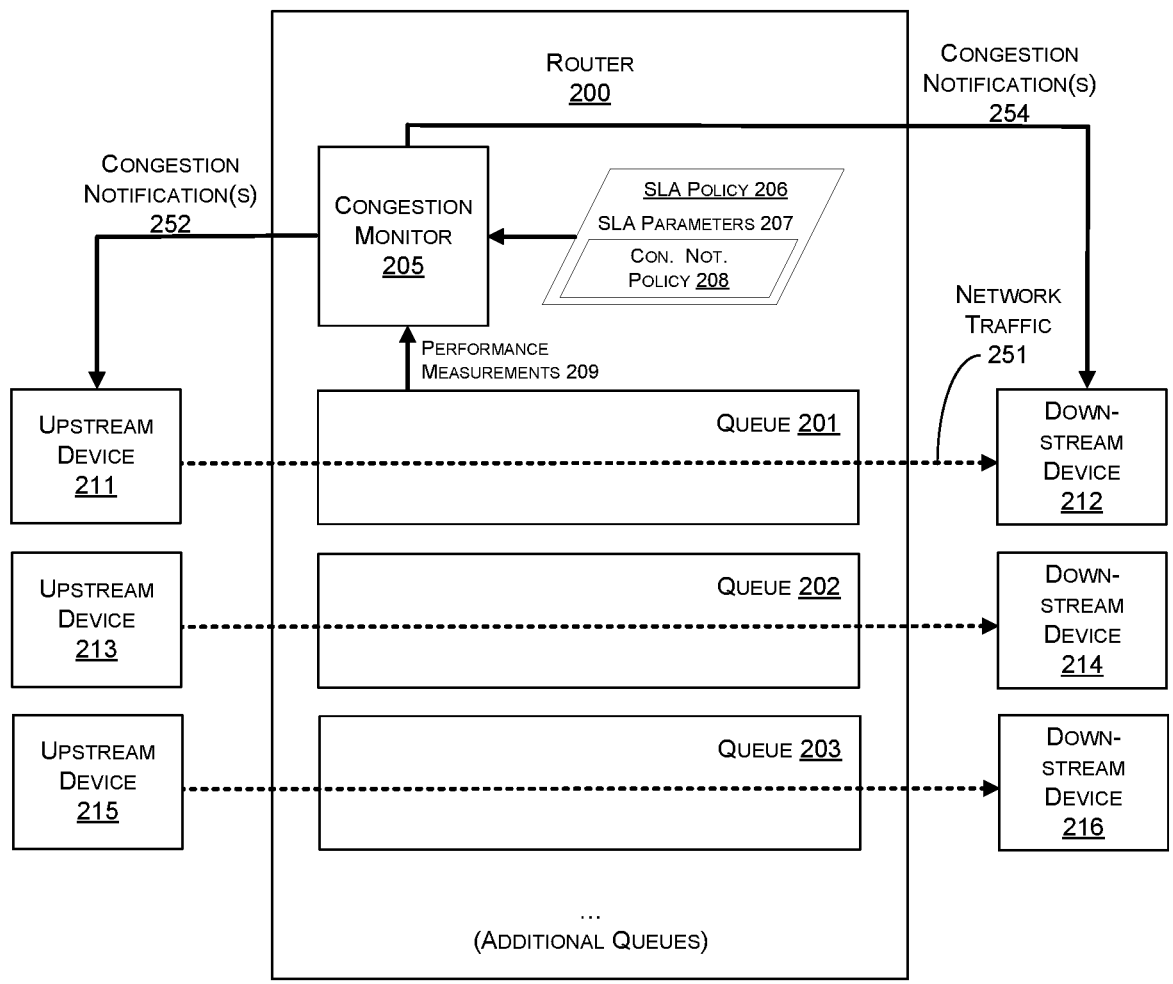
FIG. 2 illustrates an example router device configured to perform the disclosed proactive congestion notification techniques, in accordance with various aspects of the technologies disclosed herein.

FIG. 2 illustrates an example router device configured to perform the disclosed proactive congestion notification techniques, in accordance with various aspects of the technologies disclosed herein. The example router 200 can implement, e.g., the router 131 introduced in FIG. 1 in some embodiments.

The example router 200 comprises queues, including queue 201, queue 202, queue 203, and any additional queues. The example router 200 further comprises a performance monitor 205 and an example SLA policy 206. The SLA policy 206 includes SLA parameters 207 which can specify SLA performance thresholds, and a congestion notification policy 208. FIG. 2 further illustrates example upstream and downstream devices that can send network traffic 251 to the router 200 and receive network traffic 251 from the router 200, respectively. The example upstream devices include upstream device 211, upstream device 213, and upstream device 215. The example downstream devices include downstream device 212, downstream device 214, and downstream device 216.

In an example according to FIG. 2, the network traffic 251 processed through the queue 201 may be subject to the SLA policy 206. The congestion monitor 205 can be configured to monitor performance measurements 209 associated with the network traffic 251, for example by monitoring loss, latency and jitter associated with the network traffic 251 processed through the queue 201. The congestion monitor 205 can furthermore be configured to determine, based on an application of the congestion notification policy 208 to the SLA performance thresholds included in the SLA parameters 207, congestion notification threshold(s) for the performance measurements 209.

In response to a performance measurement of the performance measurements 209 meeting or exceeding a congestion notification threshold of the congestion notification threshold(s), the congestion monitor 205 can be configured to send one or more congestion notification(s) 252 to an upstream device 211 that generates network traffic 251 processed through the queue 201, and the congestion monitor 205 can optionally furthermore be configured to send one or more congestion notification(s) 254 to a downstream device 212 that receives network traffic 251 processed through the queue 201.

Figure 3:
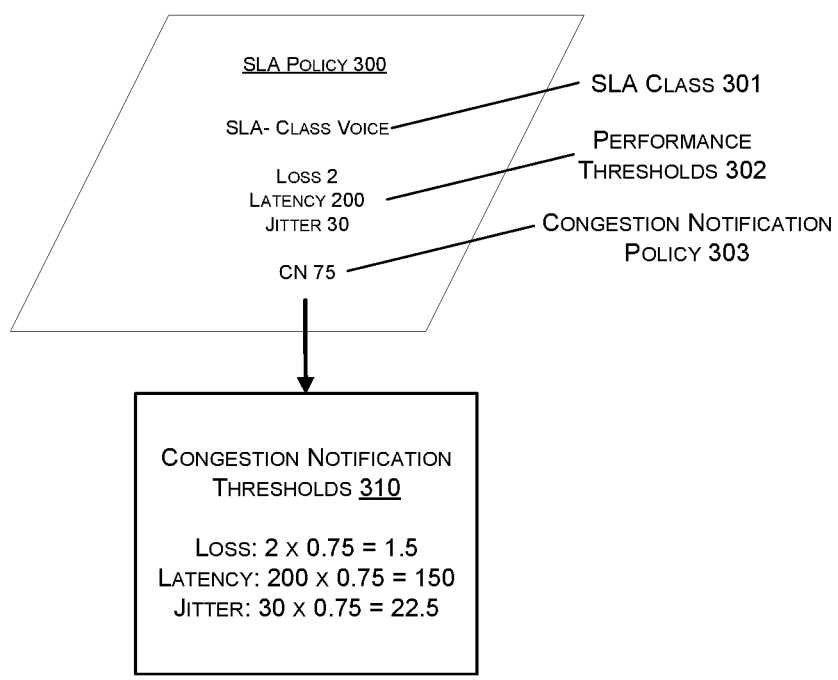
FIG. 3 illustrates an example service level agreement (SLA) policy comprising a congestion notification policy, in accordance with various aspects of the technologies disclosed herein.

FIG. 3 illustrates an example SLA policy comprising a congestion notification policy, in accordance with various aspects of the technologies disclosed herein. The example SLA policy 300 can implement, e.g., the SLA policy 206 introduced in FIG. 2 in some embodiments.

The example SLA policy 300 comprises an SLA class 301, performance thresholds 302, and a congestion notification policy 303. In the illustrated example, the SLA class 301 is SLA-class voice. The performance thresholds 302 comprise an example loss threshold of 2%, an example latency threshold of 200 ms, and an example jitter threshold of 30 ms. The example congestion notification policy is CN 75, i.e., a congestion notification is sent when performance measurements reach 75% of a performance threshold.

The SLA policy 300 can be processed, e.g., by a router 200, to derive congestion notification thresholds 310 based on the congestion notification policy 303 and the performance thresholds 302. In the illustrated example, the congestion notification thresholds 310 include a loss threshold of 2×75%=1.5%, a latency threshold of 200 ms×75%=150 ms, and a jitter threshold of 30×75%=22.5%.

When a performance measurement exceeds 75% of a performance threshold, a router, e.g., an SDWAN edge router implemented by the router 200, can set an ECN bit on SLA forwarding to notify a source, e.g., the upstream device 211, to reduce a data transmission rate, such as the rate of sending network traffic 251. When the congestion notification, i.e., packets including the ECN bit, are received at upstream device 211 or other source server, the source server can responsively reduce a congestion window and eventually can reduce the source transmission rate of network traffic 251.

Congestion notification policies according to this disclosure are not limited to the example shown in FIG. 3. For example, a congestion notification policy can specify any portion applicable to performance thresholds, e.g., any portion between 65%-95%, or optionally any portion in a range of 70%-90% of the performance threshold. Congestion notification policies can also be expressed in other ways, as noted herein, e.g., as fractions such as 3/4 or 4/5. Furthermore, in some embodiments, different congestion notification policies can be used with different performance thresholds.

In accordance with the example congestion notification policy of "CN 75", and the performance thresholds shown in FIG. 3, an ECN bit can be set by the router 200 when a current loss exceeds 1.5% or when latency exceeds 150 ms, or when jitter exceeds 23 ms (based on rounding 22.5 to the nearest whole number). In response to the ECN bit, an application at the upstream device 211 can slow down its transmission rate to improve end-to-end congestion for SLA forwarding. Decisions about when to stop using the ECN bit at the router 200 can optionally be based on the congestion notification policy 303, or optionally, using a different percentage or portion of an SLA performance threshold 302.

In some embodiments, congestion notification policies such as 303 can include additional or different features, beyond specifying a portion or percentage of SLA performance thresholds 302. For example, as set forth herein, some congestion notification policies may specify the use of ECNs upon any change of an SLA. Some congestion notification policies may specify the use of particular types of performance measurements, e.g., based on best performance measurements (e.g., during a time window), worst performance measurements, average performance measurements over a trailing time window, or "best of worst" type performance measurements, or otherwise.

Figure 4:
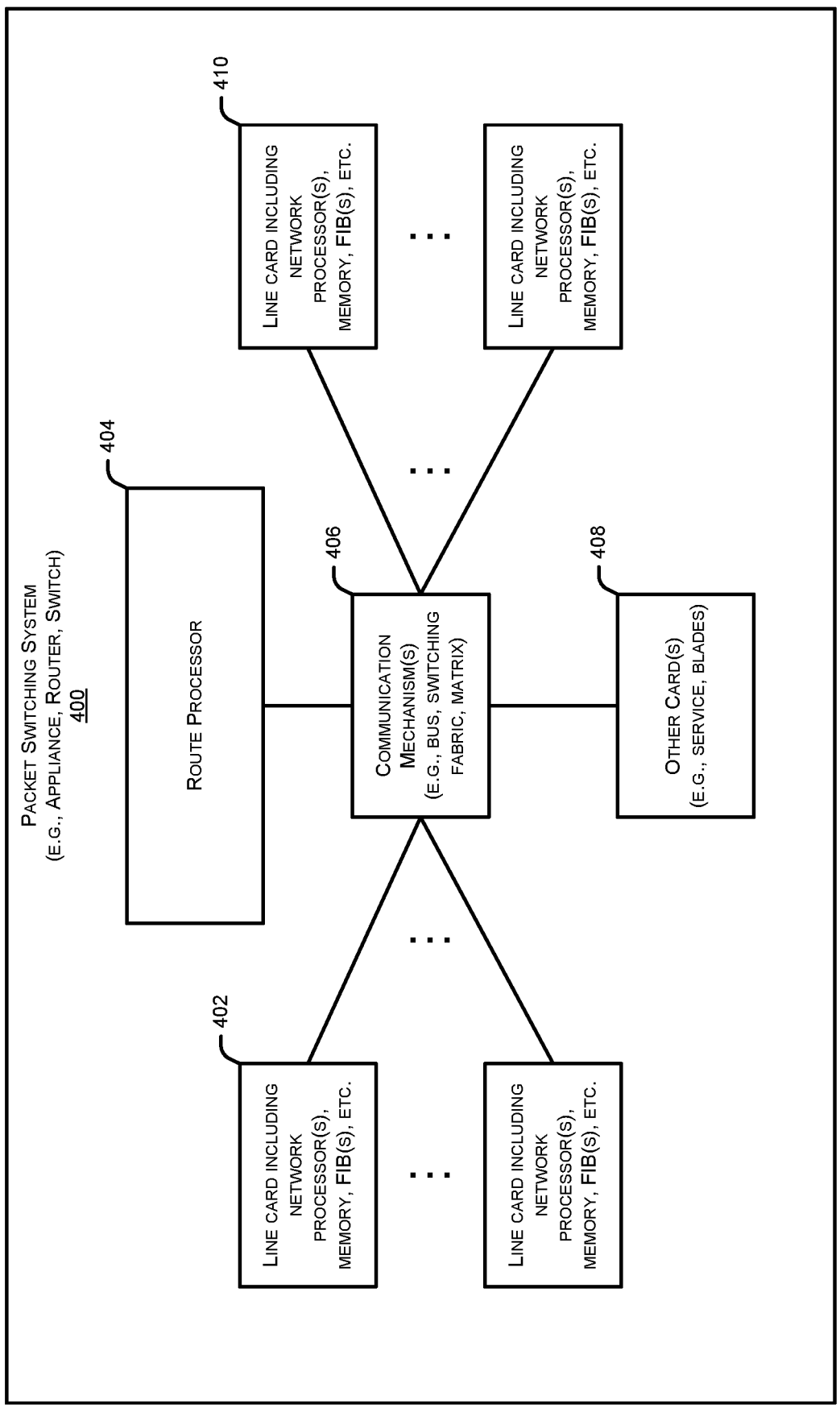
FIG. 4 illustrates an example packet switching system that can be utilized to implement a router or other access point device, in accordance with various aspects of the technologies disclosed herein.

FIG. 4 illustrates an example packet switching system 400 that can be utilized to implement a router or other access point device, in accordance with various aspects of the technologies disclosed herein. In some examples, the packet switching system 400 can be implemented as one or more packet switching device(s). The packet switching system 400 may be employed in a network, for example, the packet switching system 400 can implement the router 131 illustrated in FIG. 1, to process network traffic by receiving and forwarding packets. The illustrated elements of the packet switching system 400 can include, e.g., components introduced in any of FIGS. 1-3 to configure the packet switching system 400 to perform operations according to this disclosure.

In some examples, the packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements, e.g., the route processor 404 for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network.

The packet switching system 400 may comprise a communication mechanism 406 (e.g., bus, switching fabric, and/or matrix, etc.) for allowing the different entities such as the multiple line card(s) 402, 410, the route processor 404, and the other cards 408 to communicate. The communication mechanism 406 can optionally be hardware-based. Line card(s) 402, 410 may perform the actions of being both an ingress and/or an egress line card of the line card(s) 402, 410, with regard to multiple packets and/or packet streams being received by, or sent from, the packet switching system 400.

Figure 5:
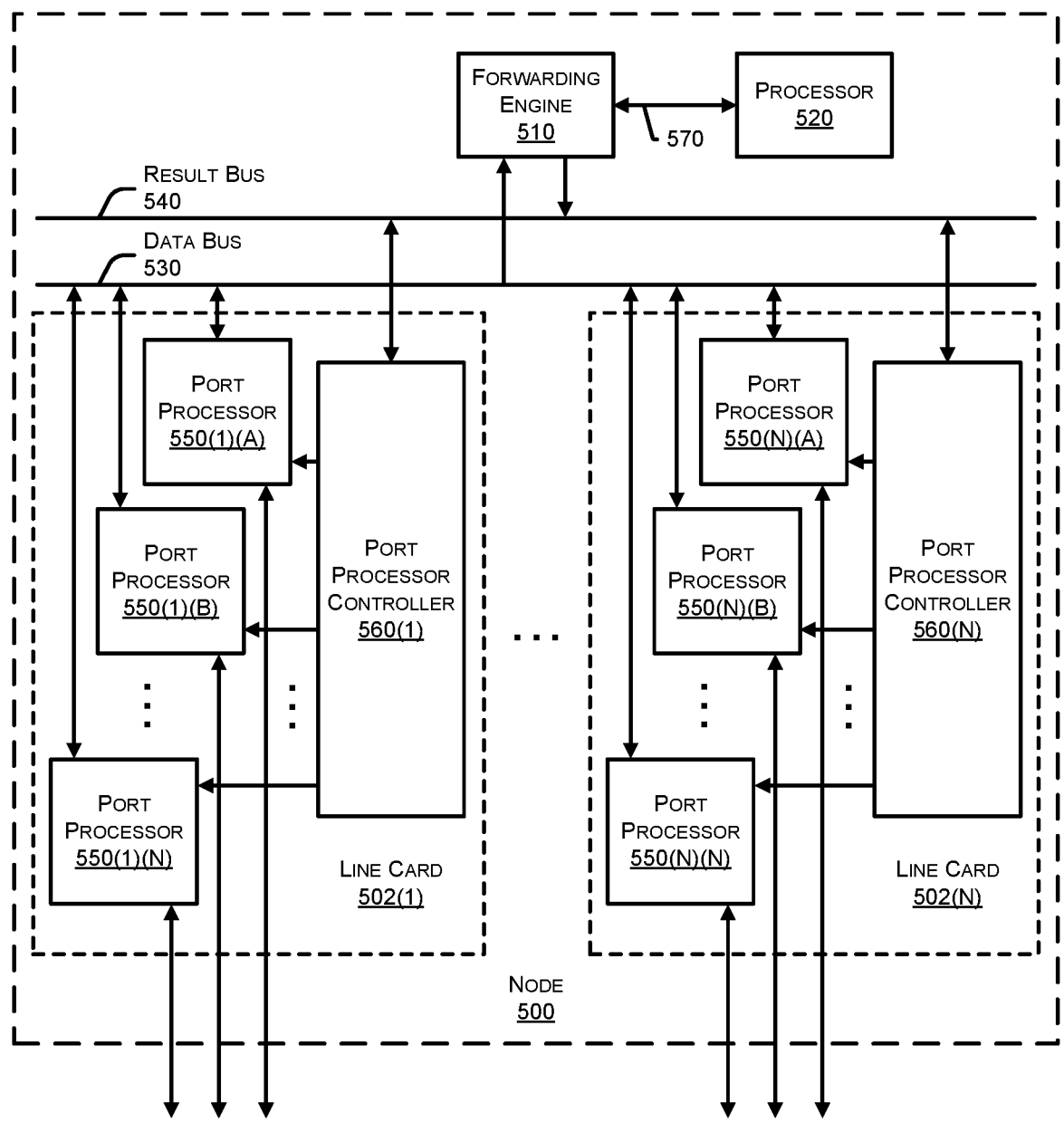
FIG. 5 illustrates an example node that can be utilized to implement a router or other access point device, in accordance with various aspects of the technologies disclosed herein.

FIG. 5 illustrates an example node 500 that can be utilized to implement a router or other access point device, in accordance with various aspects of the technologies disclosed herein. In some examples, node 500 may include any number of line cards 502, e.g., line cards 502(1)-(N), where N may be any integer greater than 1, and wherein the line cards 502 are communicatively coupled to a forwarding engine 510 (also referred to as a packet forwarder) and/or a processor 520 via a data bus 530 and/or a result bus 540.

Line cards 502 may include any number of port processors 550, for example, line card 502(1) comprises port processors 550(1)(A)-550(1)(N), and line card 502(N) comprises port processors 550(N)(A)-550(N)(N). The port processors 550 can be controlled by port processor controllers 560, e.g., port processor controllers 560(1), 560(N), respectively.

Additionally, or alternatively, the forwarding engine 510 and/or the processor 520 can be coupled to one another via the data bus 530 and the result bus 540 and may also be communicatively coupled to one another by a communications link 570. The processors (e.g., the port processor(s) 550 and/or the port processor controller(s) 560) of each line card 502 may optionally be mounted on a single printed circuit board.

When a packet or packet and header are received, the packet or packet and header may be identified and analyzed by the node 500 in the following manner. Upon receipt, a packet (or some or all of its control information) or packet and header may be sent from one of port processor(s) 550 at which the packet or packet and header was received and to one or more of those devices coupled to the data bus 530 (e.g., others of the port processor(s) 550, the forwarding engine 510 and/or the processor 520). Handling of the packet or packet and header may be determined, for example, by the forwarding engine 510.

For example, the forwarding engine 510 may determine that the packet or packet and header should be forwarded to one or more of the other port processors 550. This may be accomplished by indicating to corresponding one(s) of port processor controllers 560 that a copy of the packet or packet and header held in the given one(s) of port processor(s) 550 should be forwarded to the appropriate other one of port processor(s) 550. Additionally, or alternatively, once a packet or packet and header has been identified for processing, the forwarding engine 510, the processor 520, and/or the like may be used to process the packet or packet and header in some manner and/or may add packet security information in order to secure the packet.

On a node 500 sourcing a packet or packet and header, processing may include, for example, encryption of some or all of the packet or packet and header information, the addition of a digital signature, and/or some other information and/or processing capable of securing the packet or packet and header. On a node 500 receiving a packet or packet and header, the processing may be performed to recover or validate the packet or packet and header information that has been secured.

Figure 6:
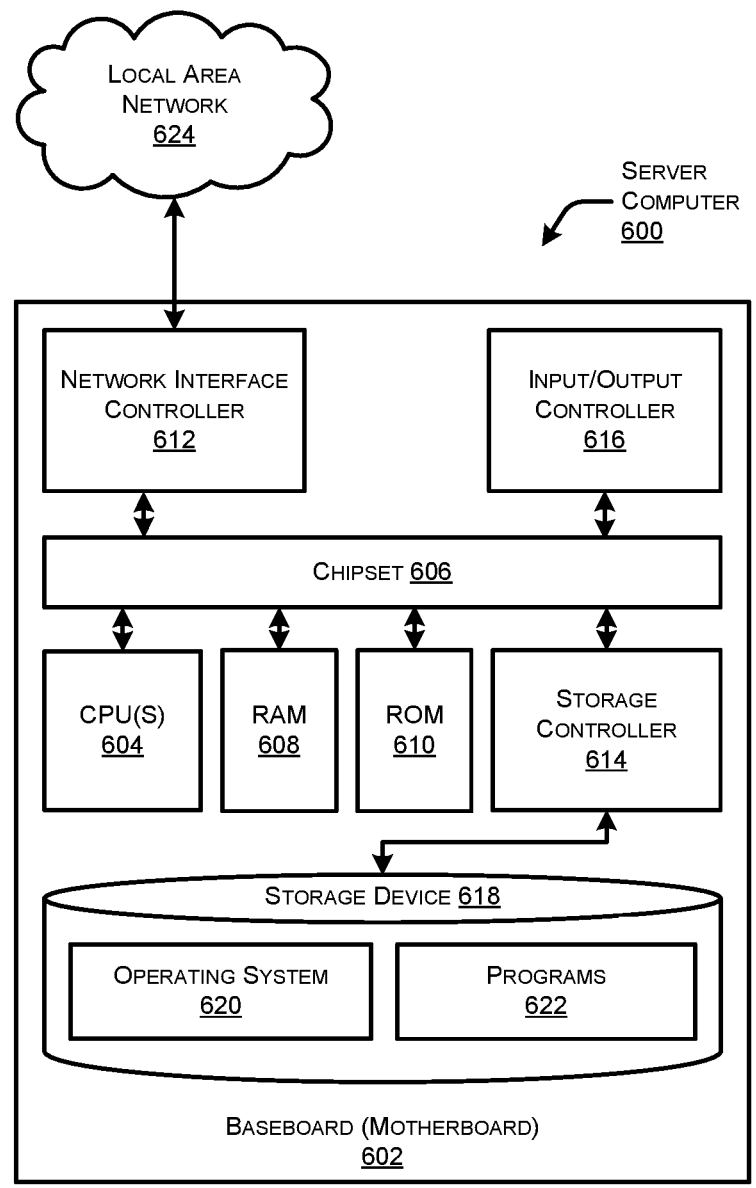
FIG. 6 illustrates an example computer hardware architecture that can implement the techniques disclosed herein, in accordance with various aspects of the technologies disclosed herein.

FIG. 6 illustrates an example computer hardware architecture that can implement the techniques disclosed herein, in accordance with various aspects of the technologies disclosed herein. The computer architecture shown in FIG. 6 illustrates a conventional server computer 600, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to startup the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein.

The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-3, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPUs 604 transition between states, as described above.

Figure 7:
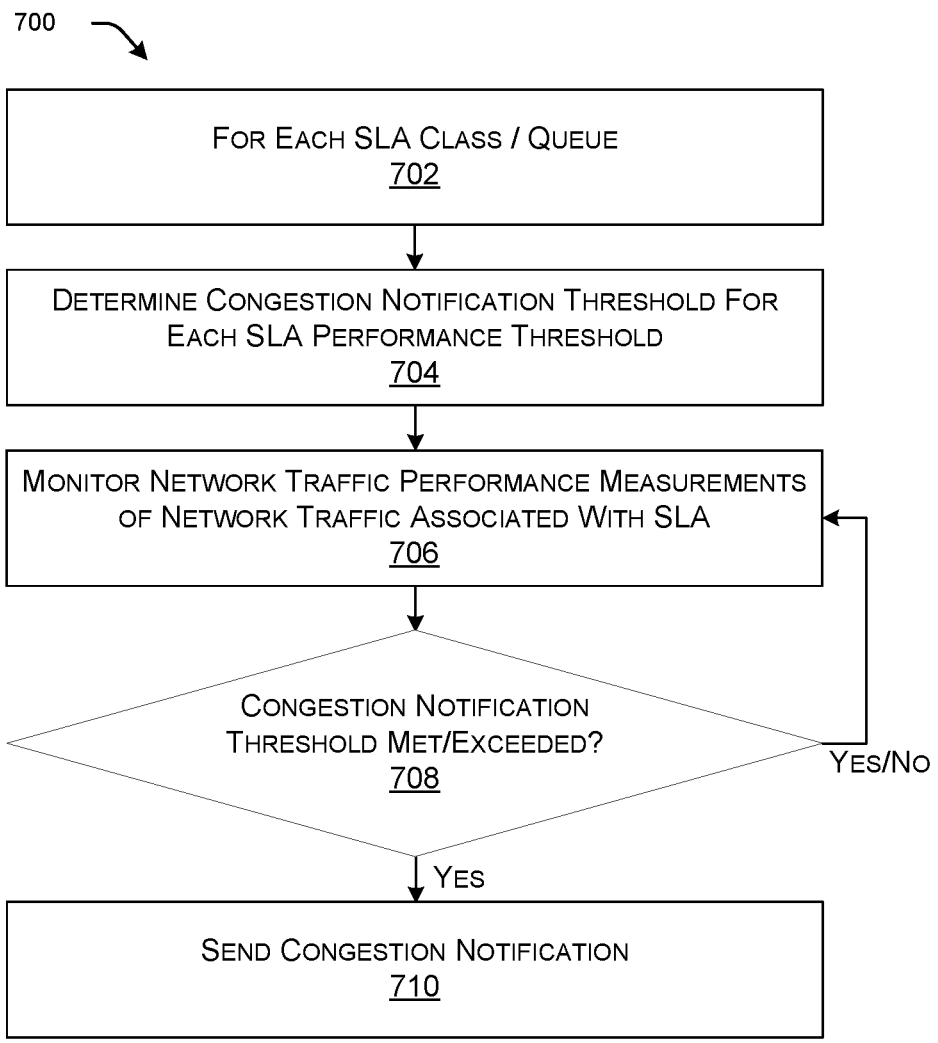
FIG. 7 is a flow diagram that illustrates an example method performed in connection with proactive congestion notification based on SLA thresholds, in accordance with various aspects of the technologies disclosed herein.

According to one embodiment, the server computer 600 has access to computer-readable storage media storing computer-executable instructions which, when executed by the server computer 600, perform the various processes described with regard to FIG. 7. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

FIG. 7 is a flow diagram of an example method 700 performed at least partly by a computing device that implements a router, such as the packet switching system 400, the node 500, or the server computer 600. The logical operations described herein with respect to FIG. 7 may be implemented (1) as a sequence of computer-implemented acts or program modules running on a computing system and/or (2) as interconnected machine logic circuits or circuit modules within the computing system. In some examples, the method 700 may be performed by a system comprising one or more processors and one or more non-transitory computer-readable media storing computer-executable instructions that, when executed by the one or more processors, cause the one or more processors to perform the method 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 is a flow diagram that illustrates an example method performed in connection with proactive congestion notification based on SLA thresholds, in accordance with various aspects of the technologies disclosed herein. In an example embodiment, the illustrated method can be performed at a router device comprising multiple queues associated with multiple SLAs, and the router device can perform the illustrated method for each of the multiple SLAs. Thus, at operation 702, the router device can begin processing for one SLA class and corresponding router queue. Alternatively, at operation 702, the router device can begin concurrent processing for multiple SLA classes and their corresponding router queues.

At operation 704, for a given SLA, the router device can determine a congestion notification threshold for each SLA performance threshold. For example, the router device can initially identify an SLA policy associated with the given SLA. FIG. 3 illustrates an example SLA policy 300. The SLA policy 300 can comprise at least one performance threshold, e.g., the performance thresholds 302 including loss, latency and jitter performance thresholds.

The SLA policy can further comprise a congestion notification policy 303. The congestion notification policy 303 can comprise a portion applicable to the performance threshold(s) 302 in order to determine congestion notification threshold(s) 310. The portion applicable to the performance threshold can be, e.g., in a range of 65%-95% of the performance threshold(s) 302. The portion indicated in the congestion notification policy 303 can be applicable to each of the loss, latency and jitter performance thresholds 302, resulting in determination of the congestion notification thresholds 310 based on the congestion notification policy 303 and the performance thresholds 302.

At operation 706, the router device can monitor network traffic performance measurements of network traffic associated with the given SLA. For example, with reference to FIG. 2, the router 200 can use congestion monitor 205 to monitor performance measurements 209 of network traffic 251 that passes through queue 201. The network traffic 251 can comprise network traffic sent between a local device such as the router 200 or another device at a branch that includes the router 200, and a remote device such as the upstream device 211 or the downstream device 212. The network traffic performance measurements 209 can comprise loss, latency and jitter measurements.

At operation 708, the router device can determine whether any of the performance measurements 209 meet or exceed a congestion notification threshold of the congestion notification thresholds 310 determined at operation 704. When a congestion notification threshold is met or exceeded (Yes), the method can proceed to operation 710. Furthermore, regardless of whether a congestion notification threshold is met (Yes/No), the monitoring at operation 706 can continue.

At operation 710, the router device can send a congestion notification, e.g., the congestion notification 252 illustrated in FIG. 2, in response to a network traffic performance measurement of the network traffic performance measurements 209 exceeding a congestion notification threshold. The congestion notification can comprise an ECN in some embodiments.

Sending the congestion notification 252 can comprise sending the congestion notification 252 to a remote device, such as the upstream device 211, to trigger a reduction in the network traffic 251. For example, the congestion notification 252 can trigger the reduction in the network traffic 251 by shortening a congestion window applied at the remote device.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
monitoring, by a router device, network traffic performance measurements of network traffic associated with a service level agreement (SLA),
wherein the network traffic performance measurements comprise loss, latency and jitter measurements;
wherein the SLA is associated with an SLA policy,
wherein the SLA policy comprises loss, latency and jitter performance thresholds,
wherein the SLA policy comprises a congestion notification policy, and
wherein the congestion notification policy comprises a defined percentage applicable to the loss, latency and jitter performance thresholds in order to determine congestion notification thresholds; and
marking, by the router device, an explicit congestion notification (ECN) bit in response to a network traffic performance measurement of the network traffic performance measurements exceeding a congestion notification threshold of the congestion notification thresholds;
wherein the router device comprises multiple queues associated with multiple SLAs, and wherein the router device performs the monitoring and marking for each of the multiple SLAs.

2. The method of claim 1, wherein the defined percentage applicable to the loss, latency and jitter performance thresholds is in a range of 65%-95% of the loss, latency and jitter performance thresholds.

3. The method of claim 1, wherein the network traffic comprises network traffic sent between a local device and a remote device, and wherein marking the ECN bit provides a congestion notification to the remote device to trigger a reduction in the network traffic.

4. The method of claim 3, wherein providing the congestion notification to the remote device triggers the reduction in the network traffic by shortening a congestion window applied at the remote device.

5. The method of claim 3, wherein marking the ECN bit provides the congestion notification to the remote device via a transfer control protocol (TCP).

6. The method of claim 1, further comprising determining the congestion notification thresholds based on the loss, latency and jitter performance thresholds and the defined percentage.

7. The method of claim 6, further comprising:
monitoring, by the router device, different network traffic performance measurements of network traffic associated with a different SLA,
wherein the different SLA is associated with a different SLA policy,
wherein the different SLA policy comprises at least one different performance threshold,
wherein the different SLA policy comprises a different congestion notification policy; and
wherein the different congestion notification policy comprises a different defined percentage applicable to the different performance threshold;
determining a different congestion notification threshold based on the at least one different performance threshold and the different defined percentage; and
marking, by the router device, a different ECN bit in response to a different network traffic performance measurement of the different network traffic performance measurements exceeding the different congestion notification threshold.

8. The method of claim 1, wherein the SLA comprises a voice SLA.

9. The method of claim 8, wherein the loss performance threshold is two percent (2%).

10. The method of claim 8, wherein the latency performance threshold is two hundred milliseconds.

11. The method of claim 8, wherein the latency performance threshold is thirty milliseconds.

12. A device comprising:
one or more processors;
one or more non-transitory computer-readable media storing computer-executable instructions that, when executed by the one or more processors, cause the one or more processors to perform operations comprising:
monitoring network traffic performance measurements of network traffic associated with a service level agreement (SLA),
wherein the network traffic performance measurements comprise loss, latency and jitter measurements;
wherein the SLA is associated with an SLA policy,
wherein the SLA policy comprises loss, latency and jitter performance thresholds,
wherein the SLA policy comprises a congestion notification policy, and
wherein the congestion notification policy comprises a defined percentage applicable to the loss, latency and jitter performance thresholds in order to determine congestion notification thresholds; and
marking, by the router device, an explicit congestion notification (ECN) bit in response to a network traffic performance measurement of the network traffic performance measurements exceeding a congestion notification threshold of the congestion notification thresholds;
wherein the device comprises multiple queues associated with multiple SLAs, and wherein the device performs the monitoring and marking for each of the multiple SLAs.

13. The device of claim 12, wherein the defined percentage applicable to the loss, latency and jitter performance thresholds is in a range of 65%-95% of the loss, latency and jitter performance thresholds.

14. The device of claim 12, wherein the network traffic comprises network traffic sent between a local device and a remote device, and wherein marking the ECN bit provides a congestion notification to the remote device to trigger a reduction in the network traffic.

15. The device of claim 14, wherein providing the congestion notification to the remote device triggers the reduction in the network traffic by shortening a congestion window applied at the remote device.

16. The device of claim 14, wherein marking the ECN bit provides the congestion notification to the remote device via a transfer control protocol (TCP).

17. A method comprising:
configuring a service level agreement (SLA) policy applied at a router, wherein configuring the SLA policy comprises:
configuring at least one loss performance threshold, at least one latency performance threshold, and at least one jitter performance threshold applicable to network traffic; and
configuring a congestion notification policy comprising a defined percentage applicable to the loss, latency and jitter performance thresholds in order to determine congestion notification thresholds;

monitoring network traffic performance measurements of the network traffic, wherein the network traffic performance measurements comprise loss, latency and jitter measurements; and marking, by the router, an explicit congestion notification (ECN) bit in response to a network traffic performance measurement of the network traffic performance measurements exceeding a congestion notification threshold of the congestion notification thresholds;

wherein the router comprises multiple queues associated with multiple SLAs, and wherein the router performs the monitoring and marking for each of the multiple SLAs.

18. The method of claim 17, wherein the defined percentage applicable to the loss, latency and jitter performance thresholds is in a range of 70%-90% of the performance threshold.

* * * * *